US009096267B2

(12) United States Patent
Mudalige et al.

(10) Patent No.: US 9,096,267 B2
(45) Date of Patent: Aug. 4, 2015

(54) EFFICIENT DATA FLOW ALGORITHMS FOR AUTONOMOUS LANE CHANGING, PASSING AND OVERTAKING BEHAVIORS

(71) Applicant: GM GLOBAL TECHNOLOGY OPERATIONS LLC, Detroit, MI (US)

(72) Inventors: Upali Priyantha Mudalige, Oakland Township, MI (US); Michael Losh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 13/746,243

(22) Filed: Jan. 21, 2013

(65) Prior Publication Data
US 2014/0207325 A1 Jul. 24, 2014

(51) Int. Cl.
B62D 15/00 (2006.01)
B62D 15/02 (2006.01)
G05D 1/02 (2006.01)
B60W 10/20 (2006.01)

(52) U.S. Cl.
CPC .......... *B62D 15/0255* (2013.01); *B62D 15/025* (2013.01); *G05D 1/0212* (2013.01); *B60W 10/20* (2013.01); *B60W 2750/30* (2013.01); *B62D 15/0265* (2013.01); *G05D 1/0274* (2013.01); *G05D 1/0278* (2013.01)

(58) Field of Classification Search
USPC .......... 701/23, 25, 26, 28, 300, 301; 180/167, 180/168, 169, 204, 401
See application file for complete search history.

(56) References Cited

U.S. PATENT DOCUMENTS

| 5,928,299 | A  | * | 7/1999  | Sekine et al. | 701/41  |
| 7,809,503 | B2 | * | 10/2010 | Nakamura et al. | 701/414 |
| 2007/0106470 | A1 | * | 5/2007  | Nakayama et al. | 701/211 |
| 2010/0274473 | A1 | * | 10/2010 | Konishi | 701/200 |
| 2011/0066312 | A1 | * | 3/2011  | Sung et al. | 701/25  |
| 2012/0123672 | A1 | * | 5/2012  | Kojima et al. | 701/410 |
| 2013/0184926 | A1 | * | 7/2013  | Spero et al. | 701/26  |
| 2013/0190964 | A1 | * | 7/2013  | Uehara | 701/25  |
| 2014/0032017 | A1 | * | 1/2014  | Anderson et al. | 701/3   |

OTHER PUBLICATIONS

Garmin, "nuvi 1100/1200/1300/1400 series owner's manual", Jan. 2011, pp. 15, 17.*
Urmson, Chris "Autonomous Driving in Urban Environments: Boss and the Urban Challenge" Journal of Field Robotics 25(8), 2008, pp. 425-466.

* cited by examiner

Primary Examiner — Tuan C. To
Assistant Examiner — Donald J Wallace
(74) Attorney, Agent, or Firm — John A. Miller; Miller IP Group, PLC

(57) ABSTRACT

A system and method for providing lane changing maneuvers in an autonomously driven vehicle. The vehicle includes a navigation controller that provides a planned route for the vehicle to follow and a vehicle controller that receives route information from the navigation controller and provides steering, braking and throttle control for the vehicle to follow the route. Either the navigation controller or the vehicle controller may initiate a lane change maneuver to cause the vehicle to be steered from a travel lane to an adjacent lane. In response to the lane change requirement, the navigation controller provides a route segment to the vehicle controller and a lane-change zone so that the vehicle controller can steer the vehicle to the adjacent lane while in the lane-change zone.

19 Claims, 4 Drawing Sheets

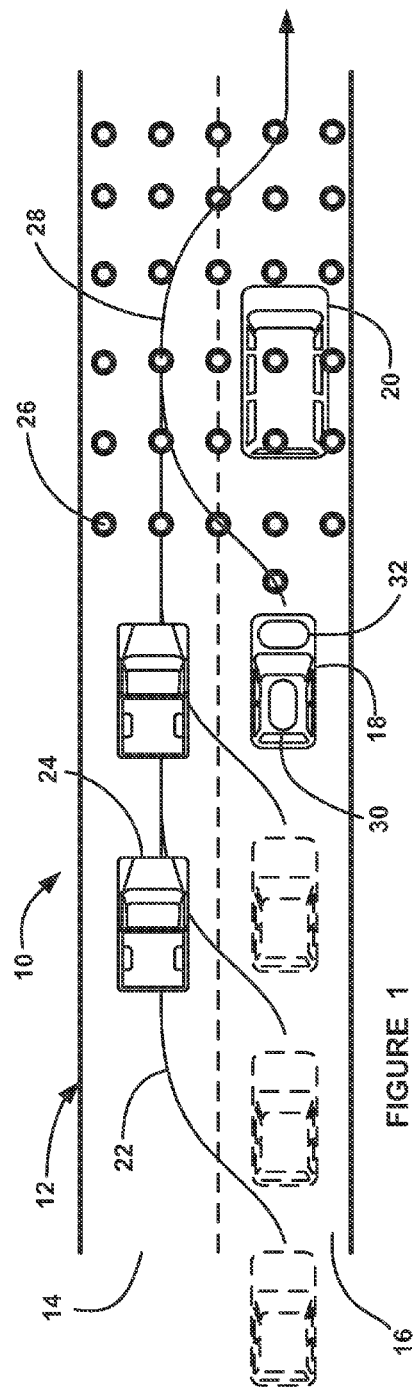
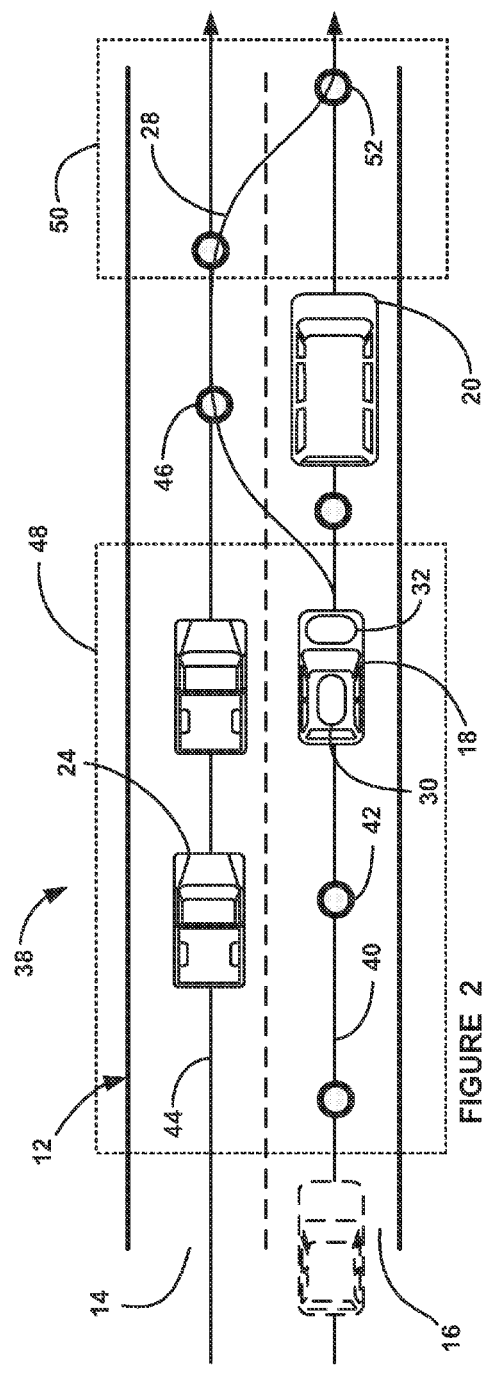

EFFICIENT DATA FLOW ALGORITHMS FOR AUTONOMOUS LANE CHANGING, PASSING AND OVERTAKING BEHAVIORS

BACKGROUND OF THE INVENTION

1. Field of the Invention

This invention relates generally to a system and method for providing lane changing maneuvers for an autonomously driven vehicle and, more particularly, to a system and method for providing lane changing maneuvers for an autonomously driven vehicle that includes using adjacent lane position information provided by a vehicle navigation controller to steer the vehicle to the adjacent lane.

2. Discussion of the Related Art

The operation of modern vehicles is becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving vehicle is detected in front of the subject vehicle using various sensors, such as radar, lidar and cameras. Modern vehicle control systems may also include autonomous parking where the vehicle will automatically provide the steering control for parking the vehicle, and where the control system will intervene if the driver makes harsh steering changes that may affect vehicle stability and lane centering capabilities, where the vehicle system attempts to maintain the vehicle near the center of the lane. Fully autonomous vehicles have been demonstrated that drive in simulated urban traffic up to 30 mph, while observing all of the rules of the road.

As vehicle systems improve, they will become more autonomous with the goal being a completely autonomously driven vehicle. Future vehicles will likely employ autonomous systems for lane changing, passing, turns away from traffic, turns into traffic, etc. Examples of semi-autonomous vehicle control systems include U.S. patent application Ser. No. 12/399,317 (herein referred to as '317), filed Mar. 6, 2009, titled "Model Based Predictive Control for Automated Lane centering/changing control systems," assigned to the assignee of this application and herein incorporated by reference, which discloses a system and method for providing steering angle control for lane centering and lane changing purposes in an autonomous or semi-autonomous vehicle. U.S. patent application Ser. No. 12/336,819, filed Dec. 17, 2008, titled "Detection of Driver Intervention During a Torque Overlay Operation in an Electric Power Steering System," assigned to the assignee of this application and herein incorporated by reference, discloses a system and method for controlling vehicle steering by detecting a driver intervention in a torque overly operation.

There are basically two different scenarios where an autonomously driven vehicle may want to change from one travel lane to an adjacent travel lane. The vehicle navigation controller on board the vehicle may change the vehicle route because the driver initiates a route change or some other factor, such as traffic congestion, causes the navigation controller to change route. Also, the autonomously driven vehicle may need to change lanes because an obstructing object, such as a slow moving vehicle, is in front of the vehicle. When the vehicle controller on board the vehicle detects an object via sensors in the pathway of the vehicle and wants to change lanes, the vehicle controller will send a request to the navigation controller for the navigation controller to provide a route segment for the vehicle to go around the object.

Executing autonomous lane changing maneuvers for every possible driving scenario, such as vehicle rerouting, overtaking and object avoidance, under different traffic situations is technologically challenging. The use of advanced knowledge about the road geometry, vehicle kinematics and location to determine safe and smooth lane changing behavior and trajectory generation for every individual driving scenario is cumbersome and computationally expensive. For example, known systems require the vehicle controller to generate a large number of plausible candidate vehicle trajectories at every vehicle position node as the vehicle travels to identify a clear space to execute lane changes. Currently, the vehicle controller calculates several and many nodes along a vehicle route, where each node represents a position and a speed of the vehicle, and where the vehicle controller steers the vehicle from one node to another node along the calculated route called a vehicle trajectory. As the vehicle moves from one position to another, the vehicle controller calculates a large number of such candidate vehicle trajectories that the vehicle can possibly travel along between the nodes, where only one of those trajectories would be selected as the best route segment by the vehicle controller, based on an optimized cost function, for the vehicle to travel along when performing the lane changing maneuver. Because of the high computation requirements associated with creating a large number of trajectories every time the vehicle moves from one position to another (e.g., at 100 millisecond position updates), the latency, i.e., the time it takes to determine the best route segment to travel on, is relatively long. Further, known solutions for lane changing may not work across multiple vehicle platforms and different road topologies.

SUMMARY OF THE INVENTION

In accordance with the teachings of the present invention, a system and method are disclosed for providing lane changing maneuvers in an autonomously driven vehicle. The vehicle includes a navigation controller that provides a planned route for the vehicle to follow and a vehicle controller that receives route information from the navigation controller and provides steering, braking and throttle control for the vehicle to follow the route. Either the navigation controller or the vehicle controller may initiate a lane change maneuver to cause the vehicle to be steered from a travel lane to an adjacent lane. In response to the lane change request, the navigation controller provides a route segment to the vehicle controller and a lane-change zone so that the vehicle controller can steer the vehicle to the adjacent lane while in the lane-change zone.

Additional features of the present invention will become apparent from the following description and appended claims, taken in conjunction with the accompanying drawings.

BRIEF DESCRIPTION OF THE DRAWINGS

FIG. 1 is an illustration of an autonomously driven vehicle changing lanes using a known technique;

FIG. 2 is an illustration of an autonomously driven vehicle changing lanes using a parallel navigation path;

DETAILED DESCRIPTION OF THE EMBODIMENTS

Figure 3:
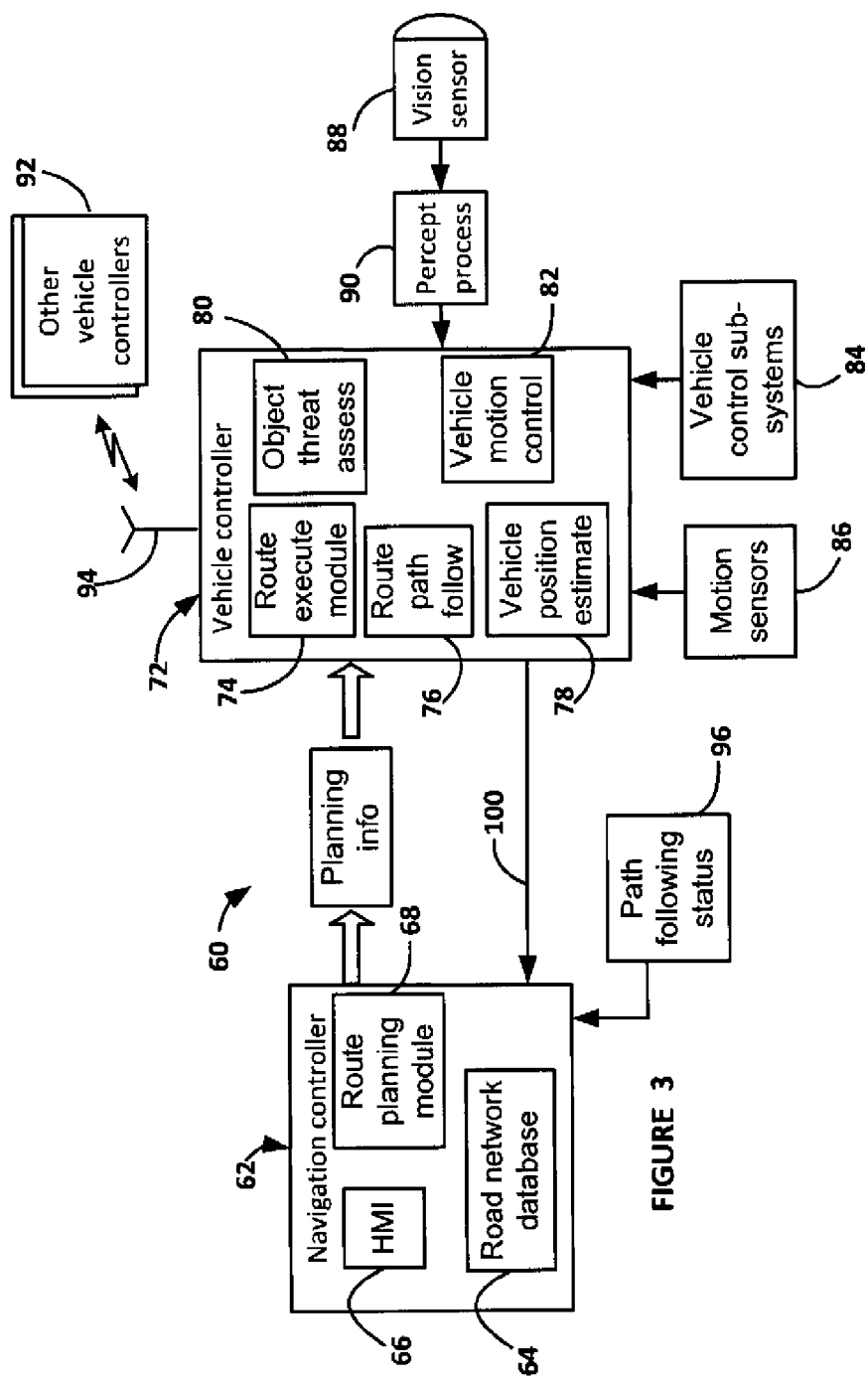
FIG. 3 is a schematic block diagram of a vehicle system including a navigation controller and a vehicle controller.

The following discussion of the embodiments of the invention directed to a system and method for providing lane changing maneuvers for an autonomously driven vehicle is merely exemplary in nature, and is in no way intended to limit the invention or its applications or uses.

As will be discussed in detail below, the present invention proposes a technique for performing a lane-change maneuver in an autonomously driven vehicle. The invention provides a technique for providing route information from a navigation controller to a vehicle controller on the vehicle, where the vehicle controller may request a reroute travel path from the navigation controller for the lane-change maneuver or the lane-change maneuver may be a navigation controller initiated reroute because of driver route changes or other map database scenarios requiring a lane change. Although the discussion herein specifically talks about an autonomously driven vehicle, those skilled in the art will recognize that the present invention has application for semi-autonomously driven vehicles.

FIG. 1 is an illustration 10 of a vehicle roadway 12 including two adjacent travel lanes 14 and 16. A subject vehicle 18 is traveling along the lane 16 where previous positions of the vehicle 18 in the lane 16 are shown in phantom, and where the subject vehicle 18 includes a vehicle controller 30 and a navigation controller 32. The navigation controller 32 is responsible for obtaining GPS and map database information and converting that information to routes for the vehicle 18 to travel on from its current location to a desired location along a calculated or planned route. The navigation controller 32 generates a number of nodes 26 that define locations that the vehicle 18 can move to in the roadway 12 along the route where the nodes 26 are continuously updated each time a new GPS sample is generated. The navigation controller 32 uses the nodes 26 to define route segments that are some portion of the entire route the vehicle 18 is traveling to get from its current location to its destination. The vehicle controller 30 is responsible for taking the route segments provided by the navigation controller 32, and provide steering, braking and throttle control of the vehicle 18 so that the vehicle travels from one node 26 to another node 26 along the route segments.

A slower or stopped vehicle 20 is shown in the lane 16 in front of the subject vehicle 18, where the vehicle 18 wants to travel into the lane 14 to go around the vehicle 20. As the subject vehicle 18 approaches the stopped vehicle 20 and is detected, the vehicle controller 30 will request alternate route segments, such as segments 22, from the navigation controller 32 that provides a path around the vehicle 20 by traveling into the lane 14. As the subject vehicle 18 approaches the stopped vehicle 20 some of those segments 22 are unusable because blocking vehicles 24 are traveling in the lane 14 adjacent to the vehicle 18 or those segments cannot be used to safely and smoothly navigate the vehicle 18 from the centerline of the lane 16 to the centerline of the lane 14. In this example, route segment 28 is ultimately selected by the vehicle controller 30 that allows the vehicle 18 to safely change lanes from the lane 16 to the lane 14 by steering to certain nodes 26 to allow the subject vehicle 18 to travel around the stopped vehicle 20.

The number of the nodes 26 in the perpendicular direction to the vehicle travel would depend on the number of available lanes for vehicle travel. The vehicle controller 30 calculates a predetermined cost function based on various parameters and data so that the path that the vehicle 18 travels from one of the nodes 26 to another node 26 will be selected based on the other paths that are available to satisfy the cost function. Thus, it is clear that in order for the subject vehicle 18 to travel around the stopped vehicle 20, significant computing memory and power is required to calculate the many available routes and select which of those routes satisfies the cost function for the vehicle 18 to follow.

FIG. 2 is an illustration 38 similar to the illustration 10, where like elements are identified by the same reference numeral. The illustration 38 shows the subject vehicle 18 traveling from the lane 16 to the lane 14 around the stopped vehicle 20 using a proposed lane changing algorithm that reduces the computation complexity that is required in the illustration 10. The subject vehicle 18 travels along a route segment 40 in the lane 16 by steering to nodes 42. When the vehicle controller 30 detects the stopped (or slow) vehicle 20, it requests a route change to the adjacent lane 14 from the navigation controller 32 that the subject vehicle 18 can steer to and travel around the vehicle 20. The navigation controller 32 responds to the request from the vehicle controller 30 by providing target nodes 46 in the lane 14 that identify a route segment 44 in the lane 14. In addition, the navigation controller 32 provides a lane-change zone 48 that defines an area that the vehicle 18 is required to be in to make the lane change. In the illustration 38, the blocking vehicles 24 prevent the subject vehicle 18 from moving to the lane 14 while it is in the lane-change zone 48 until it reaches the segment 28 where the vehicle controller 30 causes the subject vehicle 18 to steer to the target node 46 in the route segment 44. Once the subject vehicle 18 is far enough along the lane 14, the navigation controller 32 will identify another lane-change zone 50 and the vehicle controller 30 will cause the vehicle 18 to steer to target point 52 in the route segment 40 once it has passed the stopped vehicle 20.

Based on the foregoing, the lane changing algorithm for the navigation controller initiated lane change or the vehicle controller initiated lane change can be summed up as follows. When the lane change is initiated by the navigation controller 32, the navigation controller 32 sends a target lane segment defined by nodes in the adjacent lane that is parallel to the current lane segment including the lane-change zone to the vehicle controller 30. The vehicle controller 30 looks for a clear space to execute the lane change request within the lane-change zone. If the vehicle controller 30 cannot execute the lane change within the lane-change zone, the navigation controller 32 will resend a new lane-change zone and target lane segment until the lane change is executed or cancelled by the user. If the lane changing is initiated by the vehicle controller 30, the vehicle controller 30 requests the parallel target lane segment and the lane-change zone from the navigation controller 32, where the navigation controller 32 sends the lane segment and the lane-change zone to the vehicle controller 30 until the lane change is executed or the path is free of obstacles. If the vehicle controller 30 is unable to complete the lane change due to traffic or other reasons, the vehicle controller 30 will slow down or stop the vehicle.

FIG. 3 is a schematic block diagram of a vehicle control system 60 including a navigation controller 62 that performs the various functions, operations and algorithms discussed herein. The navigation controller 62 includes a road network database 64 that provides the maps and road/lane information necessary for vehicle navigation, a human machine interface (HMI) 66 that provides the interface between user inputs and the algorithms running on the navigation controller 62, and a route planning module 68 that uses the map information and user input to plan a vehicle route and provides the route segments for lane changing and otherwise as discussed herein. The system 60 also includes a vehicle controller 72 having a route execution module 74, a route path following module 76, a vehicle position estimation module 78, an object threat assessment module 80 and a vehicle motion control module 82. All of the modules 74, 76, 78, 80 and 82 provide operations based on their description in a manner that is well understood by those skilled in the art. Various vehicle control sub-systems 84 provide information to the vehicle controller 72, where the sub-systems 84 are intended to represent any module, sensor, system, etc. on the vehicle that provides information and data to the vehicle controller 72. Motion sensors 86 provide vehicle motion information, such as vehicle speed, to the vehicle controller 72 for position estimation calculations.

The system 60 also includes a vision sensor 88 that is intended to represent any and all long range radar, short range radar, cameras, etc. on the vehicle that detect and image objects around the vehicle. The raw camera and sensor data is sent to a perception processor 90 that processes the data and provides location information of the objects to the vehicle controller 72. The vehicle controller 72 may be in communication with other vehicle controllers 92 on other vehicles using, for example, a vehicle-to-vehicle (V2V) communications protocol. An antenna 94 is used for the V2V communications protocol and to receive GPS signals. Road segment and route planning information represented by box 98 is sent from the navigation controller 62 to the vehicle controller 72. Box 96 represents a path following status of the vehicle path provided to the navigation controller 62 from the vehicle controller 72. Requests for a lane change maneuver from the vehicle controller 72 to the navigation controller 62 is represented by line 100.

The route plan that the vehicle is following includes a series of route steps where each step includes instructions involving one or two segments; specifically, instructions to drive along one road segment without changing lanes, or, instructions to change from one road segment to another road segment within a proscribed lane change zone. Each step is divided into two phases. For lane changing, the task of the initial phase is to change lanes within the proscribed lane change zone as traffic conditions allow, while the task of the objective phase is to drive the remaining portion of the destination lane of the route step. For route steps without a lane change, the initial phase task is a trivial jump to the objective phase, which similarly is to drive the remainder of the objective phase route segment. In this manner, a series of lane driving and lane changing steps can be accomplished to complete the overall route. The navigation controller 62 will revise the route plan if the path following status from the vehicle controller 72 indicates a problem or the vehicle controller 72 explicitly requests a reroute because of a blocking vehicle, road debris, collision avoidance, etc. The navigation controller 62 will send geometrical road segment descriptions, for example, the destination lane segment and the lane-change zone, needed for the vehicle controller 72 to maneuver the vehicle on the route segment.

Figure 4:
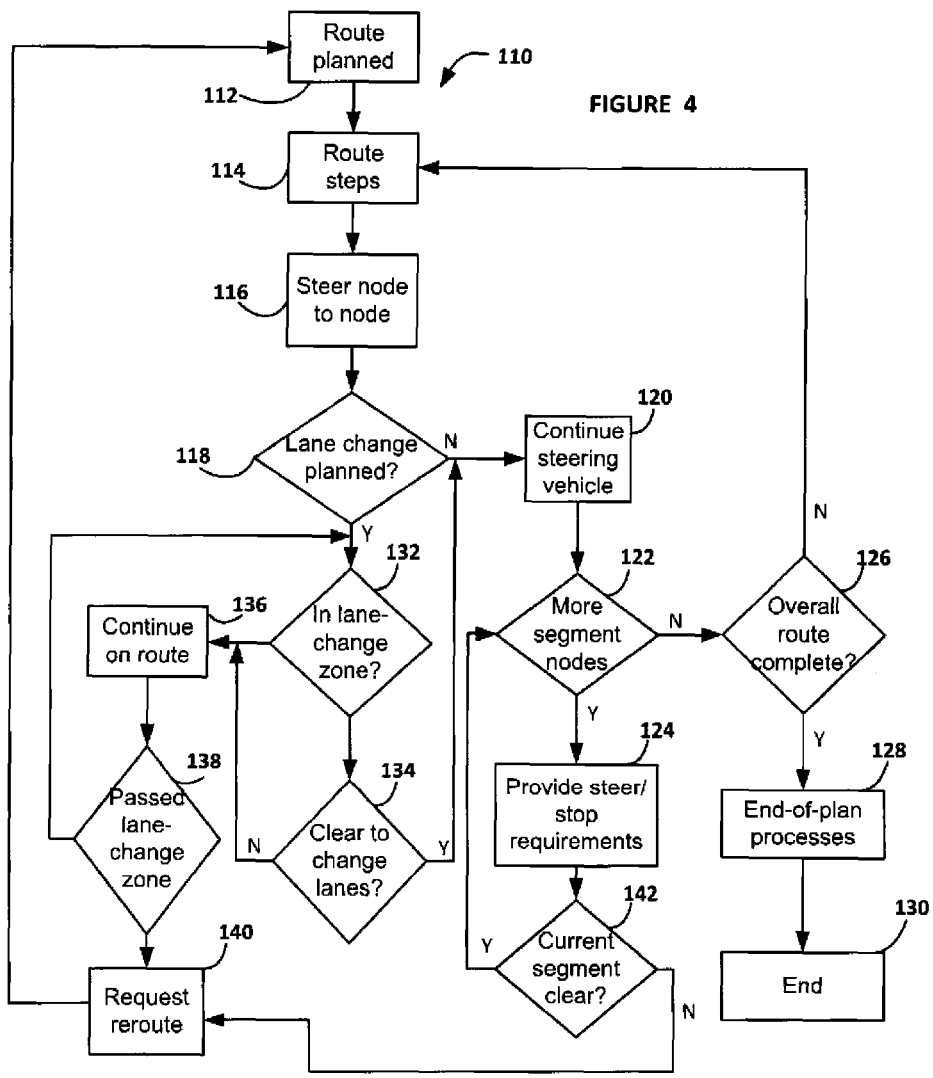
FIG. 4 is a flow chart diagram showing a process for performing a lane changing maneuver.

FIG. 4 is a flow chart diagram 110 showing a process for performing lane changing maneuvers for both navigation controller initiated maneuvers and vehicle controller initiated maneuvers, as discussed above. The algorithm begins at box 112 when a route is planned. The route will include a series of route steps, at box 114, where each step includes an initial phase that the vehicle controller executes at the beginning of the step, which may or may not include a lane change, and an objective phase that the vehicle controller will implement once the initial phase is complete so that the vehicle follows the planned route. Each step includes the identification of two road segments, one to initially drive along during the beginning of the step, and a second road segment which should be driven for the remainder of the step. If the route plan step does not include a lane change, the initial phase road segment and the objective phase road segment will be the same segment. At box 116, the vehicle algorithm performs the initial phase of the step by steering the vehicle from node to node along the route segments at the calculated speed for that phase. At decision diamond 118, the algorithm determines whether a lane change has been planned for the current step of the route plan either from the vehicle controller that recognizes an object or slow moving vehicle in front of the subject vehicle or the navigation controller for a route change as discussed above. If no lane change is requested, the algorithm continues to perform the necessary steering and vehicle speed control for the objective phase of the step at box 120.

As the vehicle controller steers the vehicle along the route segment nodes for the objective phase, the algorithm will determine if there are more segment nodes ahead for the objective phase of the current route step at decision diamond 122. If there are more segment nodes at the decision diamond 122, the vehicle controller will provide the desired speed and steering control, as well as vehicle stopping requirements, such as at stop signs, at box 124. The algorithm determines if the current route segment is clear at decision diamond 142, and if so, the algorithm continues to determine if more segment nodes are part of the objective phase at the decision diamond 122. If the vehicle controller detects an unexpected object or slower vehicle during the driving of the current objective phase segment at the decision diamond 142, the algorithm requests a reroute at box 140 from the navigation controller, and the algorithm returns to the box 112 to begin the new route. In this manner, it is possible for the vehicle to execute two consecutive lane changes where the vehicle leaves an original lane to overtake a slower vehicle or avoid an obstacle, and then returns to the original lane and proceeds along the revised route plan.

If the vehicle has reached the end of the current objective phase road segment and there are no more segment nodes for the objective phase at the decision diamond 122, the algorithm determines whether the overall route plan has been completed, i.e., the destination has been reached, at decision diamond 126, and if the route plan is not complete at the decision diamond 126, the algorithm proceeds back to the box 114 to begin execution of the next step of the route at its initial phase. If the route plan has been completed at the decision diamond 126 meaning that the vehicle has reached its destination, the algorithm performs end-of-plan processes, such as vehicle shutdown, at box 128 and the algorithm ends at box 130.

If a lane change is planned at the decision diamond 118, where the lane change route segments and the lane-change zone have been identified by the navigation controller 62, the algorithm determines whether the vehicle has entered the lane-change zone at decision diamond 132. If the vehicle has entered the lane-changing zone at the decision diamond 132, the vehicle controller then uses the information from the perception processor 90 to determine whether it is clear to change lanes at decision diamond 134. If it is clear to change lanes at the decision diamond 134, then the algorithm proceeds to perform the new objective phase based on the lane changing route segment provided by the navigation controller at the box 120. If the vehicle has not entered the lane-change zone at the decision diamond 132 or is not clear to change lanes at the decision diamond 134, the algorithm moves to box 136 to continue along the current route segment. The algorithm then determines whether the vehicle has passed the end of the lane-change zone, and if not, returns to the decision diamond 132 to determine whether the vehicle has entered the lane-change zone. Through this process, the algorithm may determine that once the vehicle has entered the lane-change zone it cannot make the lane change maneuver at the decision diamond 134, and will eventually exit the lane-change zone. If this occurs, the algorithm requests a reroute at box the 140 from the navigation controller, and the algorithm returns to the box 112 to begin that new route.

Figure 5:
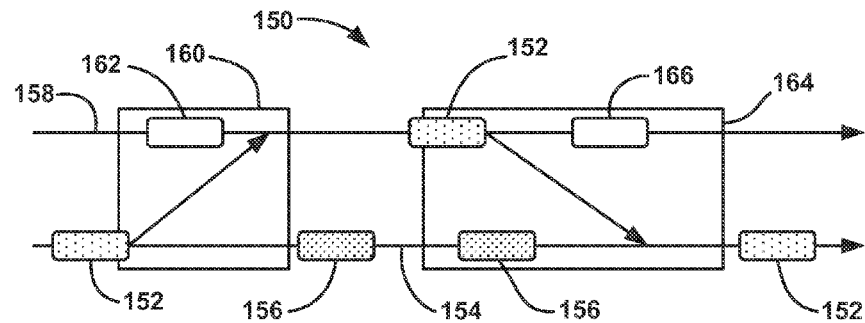
FIG. 5 is an illustration of a vehicle changing lanes to travel around another vehicle.

FIG. 5 is an illustration 150 showing a subject vehicle 152 traveling along a vehicle travel lane identified by line 154. The vehicle controller recognizes that the subject vehicle 152 is traveling faster than a vehicle 156 in front of the subject vehicle 152 in the same lane, and requests the navigation controller to provide a lane change route to pass the vehicle 156. The navigation controller responds with target nodes for an adjacent travel lane 158 and a lane-change zone 160. When the vehicle 152 is in the lane-change zone 160 and is clear of all obstacles, such as vehicle 162 traveling in the lane 158, the vehicle controller steers the vehicle 152 to change lanes so that the vehicle 152 is now traveling in the lane 158. As the vehicle 152 overtakes the vehicle 156 now traveling in the opposite lane, the vehicle controller will send another request to the navigation controller to return to the lane 154. The navigation controller will provide the target nodes back to the lane 154 and a lane-change zone 164. When the vehicle 152 enters the lane-change zone 164 and is clear of all obstacles, such as vehicle 166 in the lane 158, it will return to the lane 154 in front of the vehicle 156.

Figure 6:
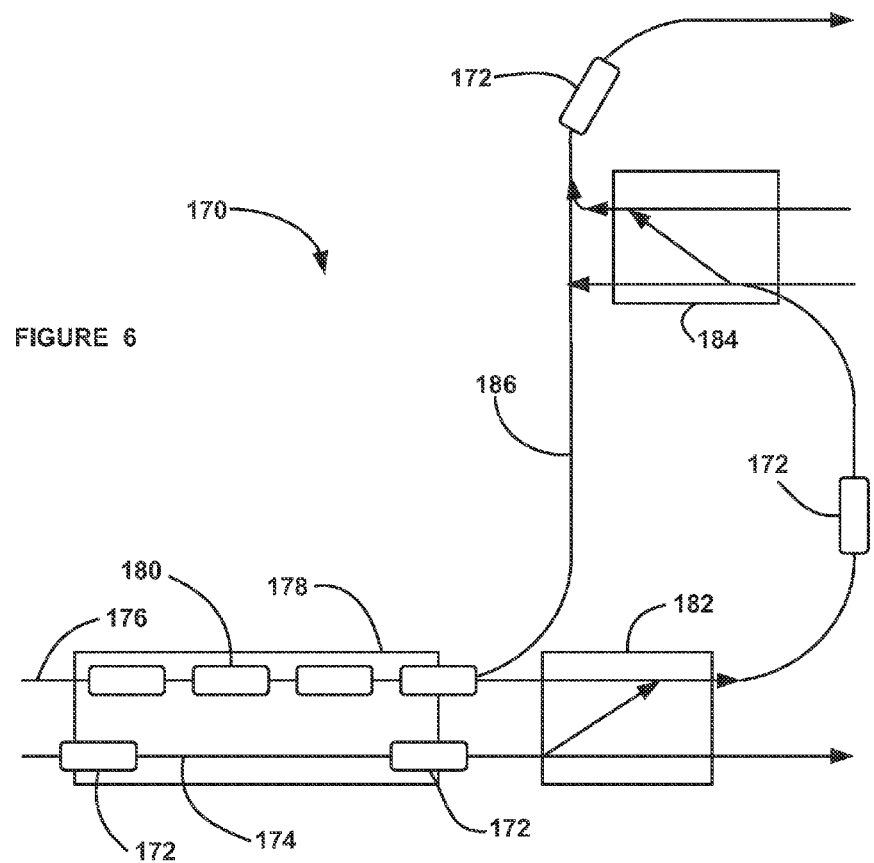
FIG. 6 is an illustration of a vehicle being rerouted because it is unable to change lanes at a desirable location.

FIG. 6 is an illustration 170 showing an autonomously driven vehicle 172 traveling along a travel lane 174 and wanting to make a left turn at a next intersection to follow a planned route 186. In order to do this, the vehicle 172 needs to change lanes into a left lane 176. The navigation controller sends a lane-change route to the vehicle controller for a lane change from the lane 174 to the lane 176 and a lane change zone 178 to make the turn. However, a line of vehicles 180 is detected by the perception controller 90 that prevents the vehicle controller from making the lane change while it is in the lane-change zone 178. When the vehicle 172 exits the lane-change zone 178 having not made the lane change, the vehicle controller requests the navigation controller to provide rerouting for the next available intersection where the vehicle 172 can make the lane change, such as in lane-change zone 182. The vehicle 172 then makes two left turns and a lane changing maneuver in lane-change zone 184 to return to the planned route 186.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for making a lane changing maneuver in an autonomously driven vehicle, said method comprising:
providing a navigation controller on the vehicle that provides a planned route for the vehicle to follow;
providing a vehicle controller on the vehicle that receives route information from the navigation controller and provides steering, braking and throttle control for the vehicle to follow the route;
initiating a lane-change maneuver by the navigation controller that includes identifying a lane-change zone;
initiating a lane-change maneuver by the vehicle controller that includes sending a reroute request to the navigation controller;
providing route information including providing a route segment from the navigation controller to the vehicle controller in response to either the navigation controller initiated lane change or the vehicle controller initiated lane change that identifies a path in an adjacent lane and that includes the identified lane-change zone for the vehicle controller to steer the vehicle to make the lane-change maneuver; and
causing the vehicle to travel from a current roadway lane to the adjacent roadway lane.

2. The method according to claim 1 wherein the identified lane-change zone that identifies an area in which the vehicle controller must steer the vehicle to make the lane-change maneuver.

3. The method according to claim 1 wherein the navigation controller initiated lane-change maneuver is in response to a driver request for a route change.

4. The method according to claim 1 wherein the navigation controller initiated lane-change maneuver is in response to traffic conditions identified by the navigation controller.

5. The method according to claim 1 wherein the vehicle controller initiated lane-change maneuver is in response to the vehicle controller identifying an object in front of the vehicle.

6. The method according to claim 5 wherein the vehicle controller initiated lane-change maneuver is provided to overtake a slower or stopped vehicle.

7. The method according to claim 6 wherein the vehicle controller initiated lane-change maneuver is a double lane-change maneuver.

8. The method according to claim 2 further comprising requesting a new route segment and a new lane-change zone from the navigation controller if the vehicle controller is unable to make the lane-change maneuver within the lane-change zone.

9. The method according to claim 1 wherein providing a route segment from the navigation controller includes providing target nodes in the adjacent roadway lane that identify locations to which the vehicle can be steered.

10. A method for making a lane changing maneuver in an autonomously driven vehicle, said method comprising:
providing a navigation controller on the vehicle that provides a planned route for the vehicle to travel;
providing a vehicle controller on the vehicle that receives route information from the navigation controller, requests a reroute from the navigation controller when obstacles are detected in the current route, and provides steering, braking and throttle control for the vehicle to follow the route;

initiating a lane-change maneuver that includes identifying a lane-change zone; and providing route information from the navigation controller in response to initiating the lane-change maneuver that identifies a path in the adjacent lane for the vehicle controller to steer the vehicle to make the lane-change maneuver, wherein providing route information includes providing the route segment of the identified path in the adjacent lane and providing a lane-change zone that identifies an area in which the vehicle controller must steer the vehicle to make the lane-change maneuver, wherein the vehicle is returned to the original lane once the lane-change maneuver is complete and all obstacles are clear.

11. The method according to claim 10 wherein initiating a lane-change maneuver includes initiating a lane-change maneuver by the navigation controller.

12. The method according to claim 11 wherein the navigation controller initiated lane-change maneuver is in response to a driver request for a route change.

13. The method according to claim 11 wherein the navigation controller initiated lane-change maneuver is in response to traffic conditions identified by the navigation controller.

14. The method according to claim 10 wherein initiating a lane-change maneuver includes initiating a lane-change maneuver by the vehicle controller, wherein the vehicle controller sends a reroute request to the navigation controller.

15. The method according to claim 10 wherein the vehicle controller initiated lane-change maneuver is in response to the vehicle controller identifying an object in front of the vehicle.

16. The method according to claim 15 wherein the vehicle controller initiated lane-change maneuver is provided to overtake a slower or stopped vehicle.

17. The method according to claim 10 further comprising requesting a new route segment and a new lane-change zone from the navigation controller if the vehicle controller is unable to make the lane-change maneuver within the lane-change zone.

18. The method according to claim 10 wherein providing a route segment from the navigation controller includes providing target nodes in the adjacent roadway lane that identify locations to which the vehicle can be steered.

19. A system for making a lane changing maneuver in an autonomously driven vehicle, said system comprising:

means for providing navigation control using a navigation controller on the vehicle that is programmed to provides a planned route for the vehicle to travel;

means for providing vehicle control using a vehicle controller on the vehicle that is programmed to receives route information from the navigation controller, to request a reroute from the navigation controller when obstacles are detected in the current route and to provides steering, braking and throttle control for the vehicle to follow the route;

means for initiating a lane-change maneuver that includes identifying a lane-change zone; and means for providing route information from the navigation controller in response to initiating the lane-change maneuver using the navigation controller or the vehicle controller that identifies a path in the adjacent lane for the vehicle controller to steer the vehicle to make the lane-change maneuver, wherein the means for providing route information also provides a route segment of the identified path in the adjacent lane and providing the lane-change zone that identifies an area in which the vehicle controller must steer the vehicle to make the lane-change maneuver, wherein the vehicle is returned to the original lane once the lane-change maneuver is complete and all obstacles are clear.

\* \* \* \* \*